United States Patent
Fedaravicius et al.

(10) Patent No.: US 8,247,012 B2
(45) Date of Patent: Aug. 21, 2012

(54) CASEIN PRODUCING METHOD AND A DEVICE FOR CARRYING OUT SAID METHOD

(76) Inventors: Vytautas Fedaravicius, Vilnius (LT); Adomas Juska, Vilnius (LT)

( * ) Notice: Subject to any disclaimer, the term of this patent is extended or adjusted under 35 U.S.C. 154(b) by 1023 days.

(21) Appl. No.: 12/092,089

(22) PCT Filed: Dec. 6, 2005

(86) PCT No.: PCT/LT2005/000004
§ 371 (c)(1),
(2), (4) Date: Aug. 4, 2008

(87) PCT Pub. No.: WO2007/052996
PCT Pub. Date: May 10, 2007

(65) Prior Publication Data
US 2008/0311269 A1    Dec. 18, 2008

(30) Foreign Application Priority Data

Nov. 2, 2005  (LT) ................................ 2005 098

(51) Int. Cl.
*A23C 1/00* (2006.01)
*A23C 9/00* (2006.01)
*B01D 63/00* (2006.01)
*C02F 9/00* (2006.01)

(52) U.S. Cl. ........ 426/491; 426/492; 426/495; 426/580; 426/522; 210/257.2; 210/257.1; 210/650; 210/514; 99/452

(58) Field of Classification Search .............. 426/491, 426/492, 495, 580, 586, 588, 522; 99/452, 99/495; 210/514, 650, 257.1, 257.2
See application file for complete search history.

(56) References Cited

U.S. PATENT DOCUMENTS

| | | | | |
|---|---|---|---|---|
| 5,169,666 | A | * | 12/1992 | Woychik ........................ 426/580 |
| 5,683,984 | A | * | 11/1997 | Jost .................................. 514/5.5 |
| 6,852,352 | B2 | | 2/2005 | Kopf et al. |
| 7,544,296 | B2 | * | 6/2009 | Kopf et al. ................. 210/257.2 |
| 2004/0142086 | A1 | * | 7/2004 | Kopf et al. ..................... 426/582 |
| 2007/0104847 | A1 | * | 5/2007 | O'Mahony et al. ........... 426/582 |

FOREIGN PATENT DOCUMENTS

| | | | |
|---|---|---|---|
| FR | 2592769 A1 | * | 7/1987 |
| RU | 93053698 | | 4/1996 |
| WO | 96 35336 | | 11/1996 |

* cited by examiner

*Primary Examiner* — Drew E Becker
*Assistant Examiner* — Luana Z Long
(74) *Attorney, Agent, or Firm* — Oblon, Spivak, McClelland, Maier & Neustadt, L.L.P.

(57) ABSTRACT

The invention can be used in varies industries, in particular, in the food, paper, chemical and pharmaceutical industries.

The inventive method consists in separating unpasteurized cow milk in a separator, wherein a skimmed milk and fats are separated. Said method is characterized in that it consists in pasteurizing said skimmed milk in a pasteurizer at a determined temperature, in cooling said milk and conveying it to an intermediate balance tank from which the milk is supplied to a micro-filtering membrane-type filter for dividing it into casein and whey proteins, in supplying the separated casein protein to a membrane-type ultrafiltration-defiltration filter, wherein the concentrated product is transferred to a drier for drying, and in cooling and packing the thus produced water-soluble casein flour.

11 Claims, 1 Drawing Sheet

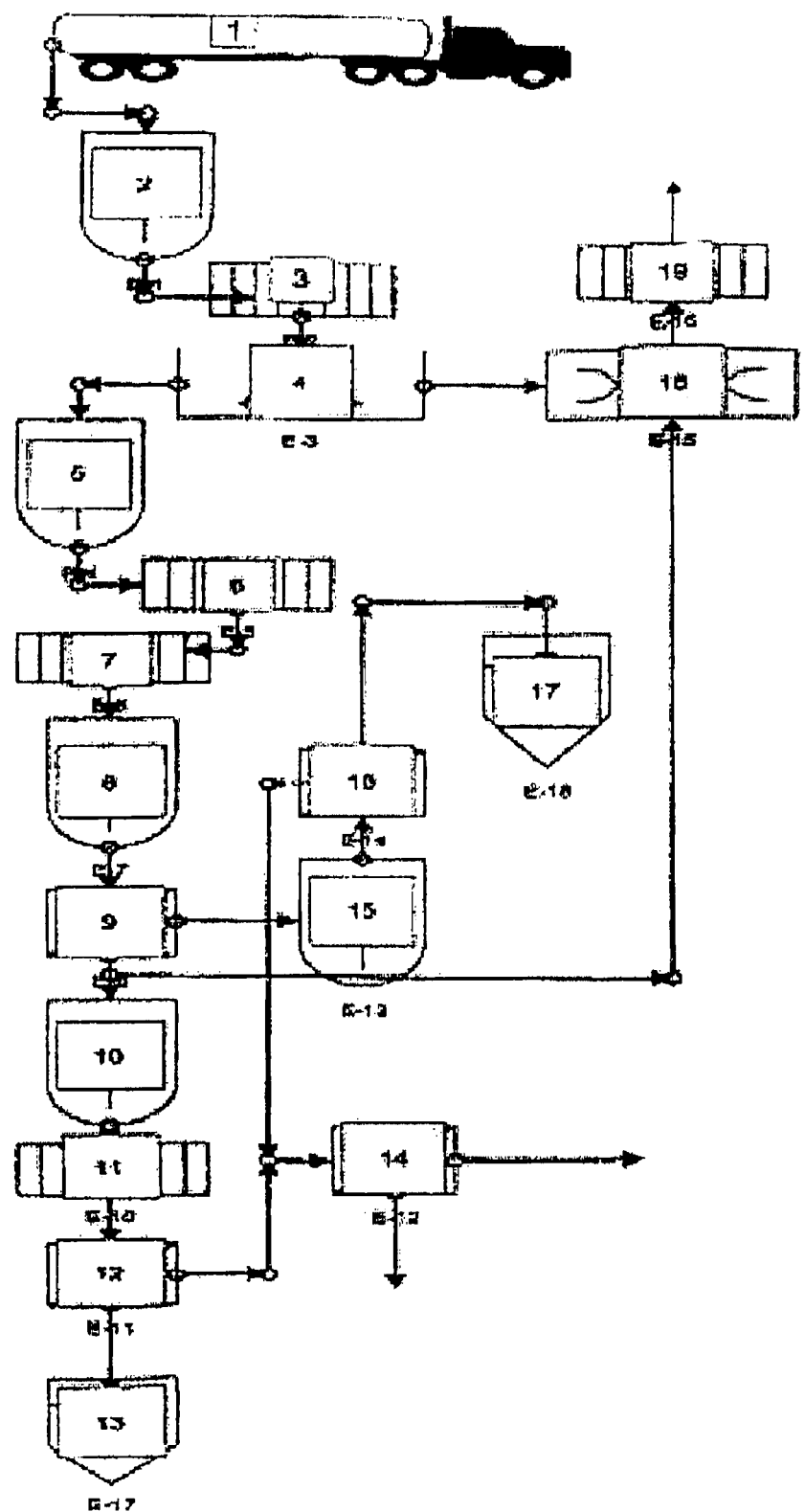

CASEIN PRODUCING METHOD AND A DEVICE FOR CARRYING OUT SAID METHOD

CROSS-REFERENCE TO RELATED APPLICATIONS

This application is a 371 of PCT/LT05/00004 filed Dec. 6, 2005 and claims the benefit of Lithuania 2005 098 filed Nov. 2, 2005.

The invention can be used in various industries, among which the most significant ones are the food, paper, chemical and pharmaceutical industries. In the milk industry, casein is used for the production of cheeses. However, presently the main scope of use of casein is caseinates produced by adding alkaline substances to casein. Depending on these addition substances, sodium, potassium or calcium caseinates may be produced. Caseinates are widely used in the milk industry for the production of cheese analogs, chocolate milk, margarine and many other products.

Casein can be produced by two different methods, namely by acid precipitation and rennet precipitation. The acidic method for the production of casein is a traditional method based on reaching the acid precipitation point of casein. Furthermore, different acids determine a different structure of precipitated casein. For example, casein precipitated by lactic acid is more granular and loose; whereas hydrochloric acid precipitation leads to a more viscous and sticky structure of casein. Rennet casein is produced by enzymatic coagulation of milk and by following optimal conditions of coagulation and clot formation. The formed clot is reduced, heated to the temperature of 58-60° C. by mixing, washed with water and dried. It is worth mentioning that the method of rennet precipitation of casein, contrary to acid precipitation, is an irreversible process. Rennet precipitated casein contains much calcium and phosphates; whereas the quantity of these salts in acid casein is limited. However, both types of casein are remarkable for their resistance to high temperatures and are of high nutritive value.

Technological methods for the production of casein are elaborated in the book of J. Dükštas and D. Kačerauskas "Pieno perdirbimo technologija" (Milk processing technology), Vilnius, 1994.

The aforementioned methods for the production of casein are also described in patents of the Russian Federation Nos. 1600671, 1692505, 2199233, 2201099.

Membrane filtration processes (microfiltration, ultrafiltration, nanofiltration and reversible osmosis)—separation (isolation) processes passing under pressure by using porous polymeric or inorganic materials—are widely used in the milk industry. For the last 30 years, these processes have been widely applied in different industries for the purification or concentration of fluid media. Whole milk, skimmed milk, pre-soured milk and whey have been processed with the help of membrane technologies. In contrast to conventional filtration used during isolation of suspended particles of the size of more than 10 μm, membrane filtration processes allow separating particles of the size of less than 10 micron. Membrane filtration allows concentrating isolated particles in a lower volume with regard to the initial volume of liquid. In such a way whey protein concentrates not containing any fats or bacteria can be produced.

Casein produced by use of the known methods has the following drawbacks:

1. Caseins are insoluble in water which complicates their direct utilization in different industries. Utilization of caseins requires converting caseins into caseinates or other acceptable forms.

2. Since the method of rennet casein precipitation is an irreversible process, the produced insoluble casein, unlike acid casein, cannot be converted into a soluble colloidal form. This property highly restricts the possibilities of its use.

3. Industrial rennet casein cannot be reprocessed.

4. Casein produced by the acidic method is an acid product; besides, the whey obtained during the production process is also acidic. Before being used, for example, in food industry, such acid products must be neutralized to the value acceptable for use.

The purpose of the invention is production of water-soluble casein without using acid, alkali or any other chemical substances.

The purpose can be achieved by using membrane micro- and ultra-filtration systems which help to separate milk proteins into whey and casein proteins. Casein protein is further treated in the membrane ultrafiltration concentrator without using any binding substances for protein separation.

A membrane method for the production of casein is proposed, where in the beginning of the production whole cow's milk is separated in a separator, wherein the fats and skimmed milk are separated. The method is characterized in that after separation the skimmed milk from an intermediate tank is pasteurized in a plate pasteurizer and stored for 15-75 seconds at the temperature of 50-80° C., the milk is then cooled to 4-10° C. and directed to an intermediate balance tank. From this tank, the milk is supplied to the membrane-type microfiltering and fractionating filter where the milk protein is divided into casein and whey proteins. The separated casein protein—the microfiltration retentate is supplied into the membrane-type ultrafiltration-defiltration filter, wherein the—casein concentrate with the solids content of 14-36%, is obtained as ultrafiltration retentate. The produced concentrated product is transferred to a drier where it is dried to 4-6% moisture, and the produced water-soluble casein powder is first supplied to the cooling cyclone and then—to the packing shop.

The equipment for the production of casein includes a membrane-type microfiltering and fractionating filter, membrane-type ultrafiltration-defiltration filter for casein protein concentration, membrane-type ultrafiltration filter for whey protein concentration.

The membrane-type protein microfiltration-concentration filter is comprised of membranes separating particles of 0.05-10 μm with their surface area of 50-310 m$^2$, filtration speed 50-120 l/cm$^2$/h, working temperature 5-28° C.

The membrane-type ultrafiltration-defiltration filter consists of membranes separating particles of 0.001-0.2 μm with their surface area of 50-310 m$^2$, filtration speed 50-120 l/cm$^2$/h, working temperature 5-28° C.

The proposed invention is described by the following diagrams:

FIG. 1—General diagram for the production of water-soluble casein from cow's milk.

Whole cow's milk delivered to the production shop is supplied from milk tanker 1 through the receiving pipeline to intermediate tank 2, wherefrom the milk is supplied to heater 3 where it is heated to the temperature of 5-58° C. The heated milk is supplied to milk fat separator 4 for separation of skimmed milk and fats. The skimmed milk produced during the separation is supplied to intermediate tank 5, then—to the plate pasteurizer, where it is stored for 15-75 seconds at the temperature of 50-87° C. Further, in plate pasteurizer 7, the skimmed milk is cooled to 5-28° C. and through intermediate tank 8 is directed to protein membrane-type microfiltering and fractionating filter 9. The microfiltration retentate (casein protein) is supplied through intermediate tank 15 to membrane-type ultrafiltration-defiltration filter 16, wherefrom the produced ultrafiltration retentate—casein protein concentrate with the solids content of 14-36%, is supplied to drier 17, where it is dried to 4-6% moisture. The powder produced in such a way has a native protein structure and is water-soluble.

Characteristics of Water-Soluble Casein:

| | |
|---|---|
| Casein protein | 74-85% |
| Fats | 0.8-2% |
| Lactose + mineral substances | 18-7% |
| Moisture | 4-6% |

When casein is produced by the method mentioned above, additional products are derived, namely: whey protein concentrate, cream (FIG. 1). Microfiltration permeate (whey proteins) is supplied through intermediate tank 10 to plate refrigerator 11, wherein it is cooled to 5-28° C. The cooled permeate is supplied to membrane-type ultrafiltration filter 12, wherefrom the ultrafiltration retentate containing 83% of whey proteins and 16-36% of solids is drained. The ultrafiltration retentate is dried in drier 13 to 4-6% moisture, which allows obtaining the whey protein concentrate with the following content:

| | |
|---|---|
| Whey proteins | 85% |
| Fats | 2% |
| Lactose + mineral substances | 7-9% |
| Moisture | 4-6% |

Cream with 60% fat is supplied from separator 4 to normalizer 18, whereto the required quantity of microfiltration permeates is supplied through intermediate tank 10. In normalizer 18, the cream is normalized, for example, to the fat content of 40% and is then supplied to cream pasteurizer 19, where it is pasteurized at temperature of 95-105° C. The produced cream is directed for further use.

The advantage of soluble casein produced by the membrane method is that no additional conversion into caseinates is required, whereas it must be carried out when casein is produced by the traditional method. Since casein is the main milk protein used in the cheese production, casein produced by the membrane method can be directly used for cheese production. This allows cutting production costs 3 times.

Also, a big advantage of water-soluble casein is the fact that neither acids or alkali or any other binding substances are used in the production process, which gives an opportunity to receive an environmentally clean product.

The invention claimed is:

1. A method, comprising
providing whole cow milk to a first intermediate tank;
transferring the whole cow milk from the first intermediate tank to a heater to heat the whole cow milk at a temperature of not more than 5°-58° C.;
transferring the heated milk to a separator to separate skimmed milk and milk fat;
transferring the skimmed milk to a second intermediate tank;
transferring the skimmed milk from the second intermediate tank to a plate pasteurizer where the skimmed milk is stored for from 15 to 75 seconds at the temperature of from 50 to 87° C.;
transferring the skimmed milk from the plate pasteurizer to a plate cooler where the skimmed milk is cooled to from 4 to 10° C.;
transferring the skimmed milk from the plate cooler to an intermediate balance tank;
transferring the skimmed milk from the intermediate balance tank to a protein membrane microfiltering and fractionating filter to separate a retentate comprising casein protein and a permeate comprising whey protein;
transferring the retentate comprising casein protein to a third intermediate tank; and
transferring the retentate comprising casein protein from the third intermediate tank to a membrane ultrafiltration-diafiltration filter to obtain a retentate comprising a water-soluble casein protein with a solids content of from 14 to 36%;
wherein the method is performed without acid, alkali, rennet or other chemical substances.

2. The method of claim 1, which further comprises transferring the retentate comprising casein protein with a solids content of from 14 to 36% to a drier where the retentate comprising casein protein with a solids content of from 14 to 36% is dried to a moisture content of from 4 to 6% to obtain a water-soluble casein powder.

3. The method of claim 2, which further comprising cooling the water soluble casein powder in a cooling cyclone.

4. The method of claim 3, further comprising packaging the cooled water-soluble casein powder.

5. The method of claim 1, further comprising
transferring the permeate comprising whey protein to a fourth intermediate tank;
transferring the permeate comprising whey protein to a plate refrigerator where the permeate comprising whey protein is cooled to from 5 to 28° C.;
transferring the cooled permeate comprising whey protein to a membrane ultrafiltration filter to obtain an ultrafiltration retentate comprising 85% of whey protein and 16-36% of solids; and
drying the ultrafiltration retentate to a moisture content of from 4 to 6% to obtain a whey protein concentrate.

6. The method of claim 1, wherein the membrane microfiltering and fractionating filter comprises a membrane with a fractionation ability of from 0.05 to 10 µm, a surface area of from 50 to 310 m$^2$, a filtration speed of from 50 to 120 l/cm$^2$/h, and a working temperature of from 5 to 28° C.

7. The method of claim 1, wherein the membrane ultrafiltration-diafiltration filter comprises a membrane with a fractionation ability of from 0.001 to 0.2 µm, a surface area of from 50 to 310 m$^2$, a filtration speed of from 50 to 120 l/cm$^2$/h, and a working temperature of from 5 to 28° C.

8. A device suitable for the production of casein from raw cow milk, comprising
a heater suitable for and configured to heat milk up to from 5° to 58° C.,
a first intermediate tank connected to the heater,
a milk fat separator connected to the first intermediate tank and a second intermediate tank,
a plate pasteurizer connected to the second intermediate tank and a plate cooler connected to a third intermediate tank,
a membrane microfiltration filter suitable for and configured to fractionate casein protein connected to the third intermediate tank and a fourth intermediate tank, and a membrane ultrafiltration and diafiltration filter connected to the fourth intermediate tank and a dryer.

9. The device of claim 8, further comprising an additional intermediate tank connected to the plate cooler and membrane-type ultrafiltration filter.

10. The device of claim 8, wherein the membrane microfiltration filter comprises a membrane with a fractionation ability of from 0.05 to 10 μm, a surface area of from 50 to 310 m$^2$, a filtration speed of from 50 to 120 l/cm$^2$/h, and a working temperature of from 5 to 28° C.

11. The device of claim 8, wherein the membrane ultrafiltration and diafiltration filter comprises a membrane with a fractionation ability of from 0.001 to 0.2 μm, a surface area of from 50 to 310 m$^2$, a filtration speed of from 50 to 120 l/cm$^2$/h, and a working temperature of from 5 to 28° C.

* * * * *